UNITED STATES PATENT OFFICE.

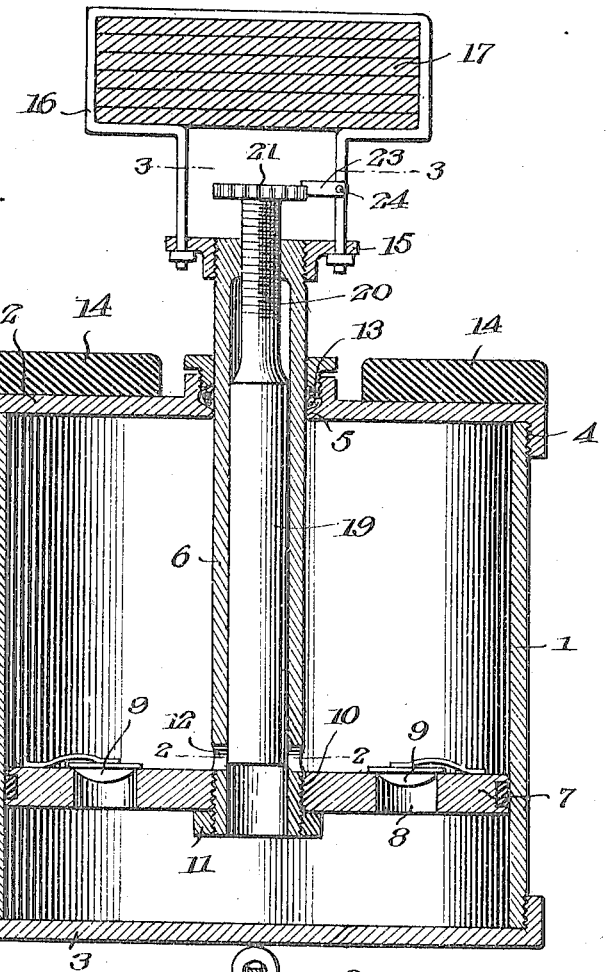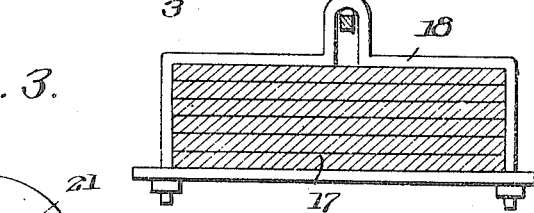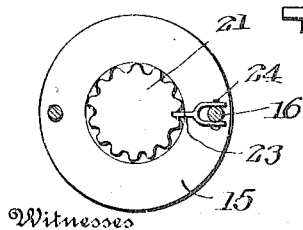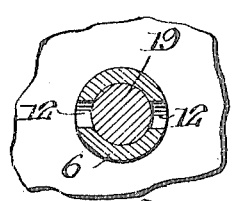

FLOYD L. REYNOLDS, OF MIDDLETON, MICHIGAN.

SHOCK-ABSORBER.

1,135,923.  Specification of Letters Patent.  Patented Apr. 13, 1915.

Application filed March 17, 1914. Serial No. 825,295.

*To all whom it may concern:*

Be it known that I, FLOYD L. REYNOLDS, a citizen of the United States, residing at Middleton, in the county of Gratiot and State of Michigan, have invented new and useful Improvements in Shock-Absorbers, of which the following is a specification.

This invention relates to shock absorbers being especially designed for use on automobiles, motor trucks and the like but as well adapted for use on any wheeled vehicle in which the body of the vehicle is supported relatively to the running gear by means of springs.

A further object of the present invention is to produce a simple and inexpensive shock absorbing device of the class referred to embodying a piston and cylinder with means for attaching said elements to different parts of a vehicle, and means for regulating the rapidity of the flow of oil or other liquid with which the cylinder is filled, from the space at one side of the piston to the space at the other side thereof, combined with means for adjusting the size of the communicating ports between the chambers at opposite sides of the piston.

With the above and other objects in view, the invention consists in the novel construction, combination and arrangement of parts, as will hereinafter be more fully described, illustrated and claimed.

In the accompanying drawings:—Figure 1 is a vertical diametrical section through the shock absorber of this invention. Fig. 2 is a cross section on the line 2—2 of Fig. 1. Fig. 3 is a cross section on the line 3—3 of Fig. 1.

In carrying out the present invention I employ a cylinder 1 provided with heads 2 and 3 preferably made separate therefrom and threaded thereon as at 4, one of said heads being imperforate and the other head being formed with a central opening 5 through which works a reciprocatory plunger 6 of tubular form.

Mounted fast on the tubular plunger 6 is a piston 7 having a liquid-tight fit at its periphery with the inner wall of the cylinder 1. The piston 7 is provided at one or more points with ports 8 extending through the same from one side to the other each of said ports being controlled by a check valve 9 which is arranged to allow the liquid to move upward while preventing the downward movement thereof in order to restrain the rebound of the springs of the vehicle with which the shock absorber is associated.

In the preferred embodiment of the invention the tubular plunger 6 is threaded through the piston 8 as shown at 10 and additionally held by means of a lock nut 11. In close proximity to the piston 7 the tubular plunger 6 is provided at opposite points with ports 12 to allow the liquid to pass to the bore of the tubular plunger 6 and outwardly through the lower end thereof into the bottom chamber of the cylinder below the piston 7. The plunger 6 passes through a stuffing box 13 on the cylinder head 2 and it is also preferred to fasten rubber cushions or bumpers 14 to the last named cylinder head to prevent said head from coming in injurious contact with some portion of the frame or body of the vehicle.

At its outer end the plunger 6 is provided with a head flange 15 preferably threaded thereon as shown and connected to the flange 15 is an attaching device shown in the form of a loop or clip 16 adapted to embrace the spring 17 of the vehicle or any other suitable part of such vehicle. Another attaching device 18 of any suitable construction is fastened to the opposite cylinder head 3 for a like purpose.

Extending longitudinally within the plunger 6 is a valve 19 shown in the form of a rod having a snug fit within the tubular plunger to adapt it to be turned as will hereinafter appear. The lower end of the valve 19 is movable across the ports 12 of the plunger and the opposite end portion of the valve is threaded as shown at 20 through the upper extremity of the plunger 6 so that by turning said valve, the lower extremity thereof may be advanced and retracted for the purpose of regulating the size of the ports 12 and thereby correspondingly varying the flow of the liquid from one side of the piston to the other. At its upper extremity the valve 19 has a head 21 fast thereon, said head having its periphery notched or serrated as at 22 to be engaged by a locking pawl or detent 23 shown as pivotally mounted at 24 on the attaching device or clip 16 above referred to. It will now be seen that by turning the valve 19 with the aid of the head 21, the size of the ports 12 may be regulated to suit the load imposed on the shock absorber. In the downward movement of the vehicle body, the liquid which preferably consists of oil of suitable density passes freely upward through the port or ports 8, passing the check valves 9 and entering the upper portion of the cylinder 1. Upon the upward rebound of the vehicle body, the valve or valves 9 immediately close and the oil or other liquid can only pass to the lower side of the piston 7 through the ports 12 the size of which has been previously adjusted by the means hereinabove described.

What I claim is:—

A shock absorber comprising a cylinder provided with attaching means, a piston in said cylinder provided with a port, a tubular plunger having a port in its side and passing through said piston and one head of said cylinder and provided with attaching means and also having a reduced and threaded bore at its outer extremity, a check valve for the port in said piston, a valve consisting of a rod having its outer end portion reduced in diameter and threaded and extended through said reduced bore of the plunger, the inner extremity of said rod being adjustable across the side port of the plunger, a notched head on one end of said valve, and a detent mounted on the attaching means of the plunger and adapted to engage and prevent said head from turning.

In testimony whereof I affix my signature in presence of two witnesses.

FLOYD L. REYNOLDS.

Witnesses:
   ZEHNA OTTO,
   E. H. NALDRETT.